United States Patent [19]

Reymond et al.

[11] Patent Number: 4,462,042

[45] Date of Patent: Jul. 24, 1984

[54] CARTOGRAPHIC INDICATING APPARATUS, PARTICULARLY FOR AERIAL NAVIGATION

[75] Inventors: Jean C. Reymond; Christian Brisseau, both of Paris, France

[73] Assignee: Thomson-CSF, Paris, France

[21] Appl. No.: 345,629

[22] Filed: Feb. 4, 1982

[30] Foreign Application Priority Data

Feb. 10, 1981 [FR] France ................................ 81 02595

[51] Int. Cl.³ ............................................ H04N 9/535
[52] U.S. Cl. ........................................ 358/22; 358/76; 358/79; 358/81
[58] Field of Search .............. 358/1, 22, 103, 79, 358/76, 81, 102, 104, 109; 353/12; 364/424, 449, 521

[56] References Cited

U.S. PATENT DOCUMENTS

| | | | |
|---|---|---|---|
| 3,131,247 | 4/1964 | Benamy | 358/104 |
| 3,539,696 | 11/1970 | Sweeney | 358/103 |
| 3,749,823 | 7/1973 | Warner | 358/81 |
| 3,761,607 | 9/1973 | Hanseman | 358/81 |
| 3,849,793 | 11/1974 | Ablett | 358/81 |
| 4,025,946 | 5/1977 | Casey | 358/81 |
| 4,415,922 | 11/1983 | Reymond | 358/22 |

FOREIGN PATENT DOCUMENTS

| | | |
|---|---|---|
| 23861 | 2/1981 | European Pat. Off. . |
| 2357022 | 1/1978 | France . |
| WO79/00175 | 4/1979 | PCT Int'l Appl. .................. 358/103 |

Primary Examiner—Tommy P. Chin
Attorney, Agent, or Firm—Karl F. Ross

[57] ABSTRACT

A cartographic indicator, usable aboard an aircraft, comprises an analyzer continuously scanning a recording medium such as an optical film or a magnetic tape on which sections of a multicolor map are stored with a reduced spectral range, i.e. as a limited number of intensities possibly allocated to two different color components. The signals or pairs of signals emitted by the analyzer upon point-by-point scanning of the recording medium are fed to a transcoder, including a programmable read-only memory, which converts them into respective combinations of three signal components respectively representing the basic colors red, green and blue; the relative magnitudes of these signal components determine the contributions of the corresponding basic colors to an image point visualized by a multicolor display device.

12 Claims, 5 Drawing Figures

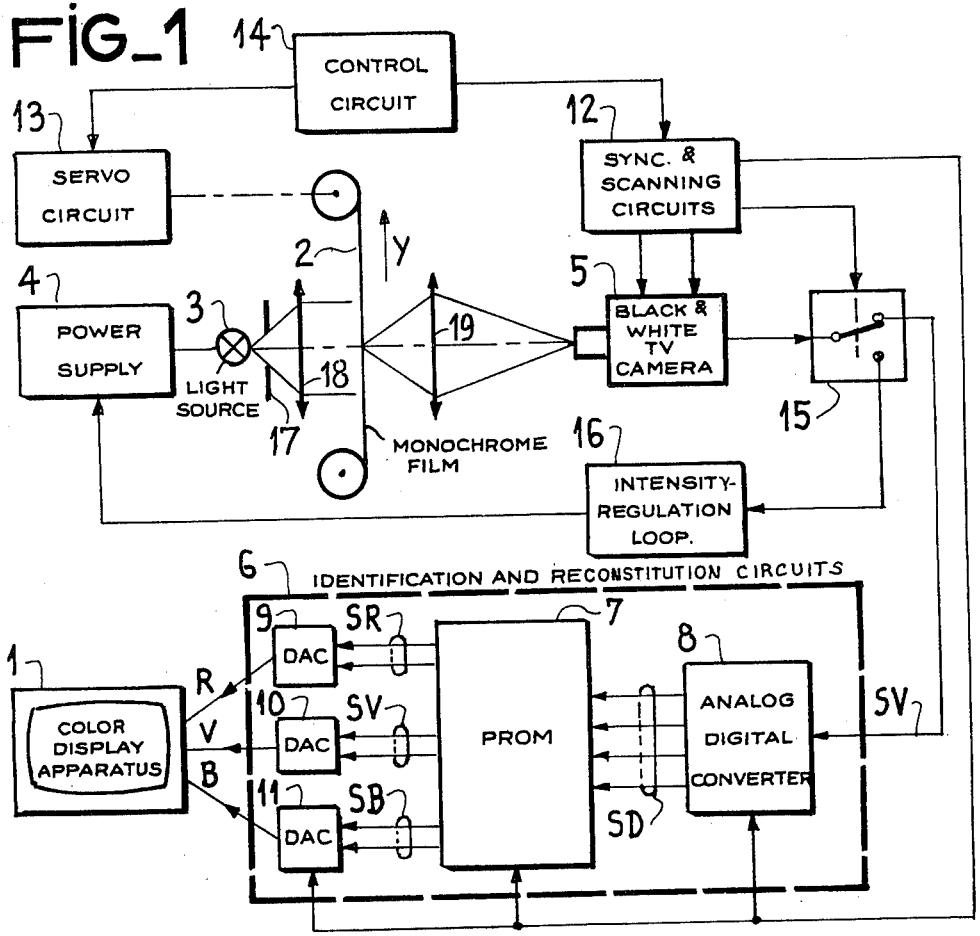
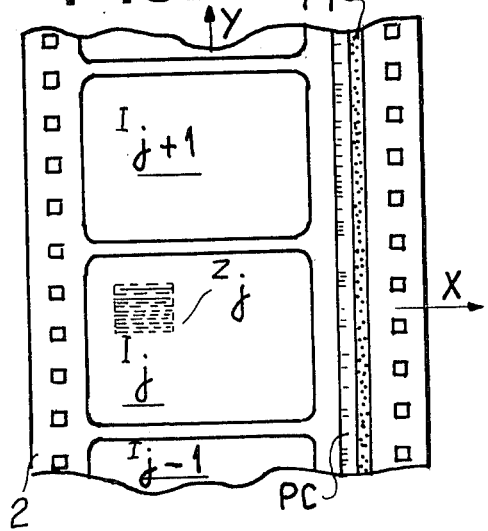
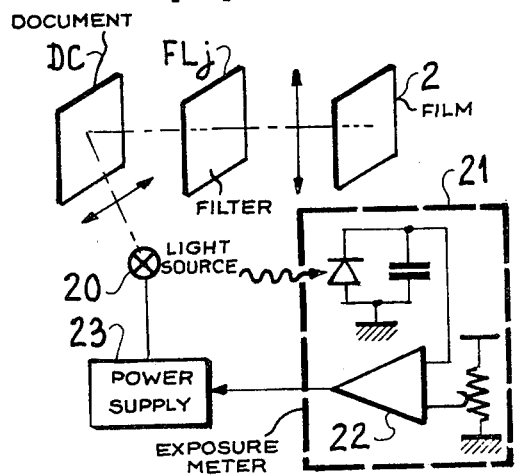

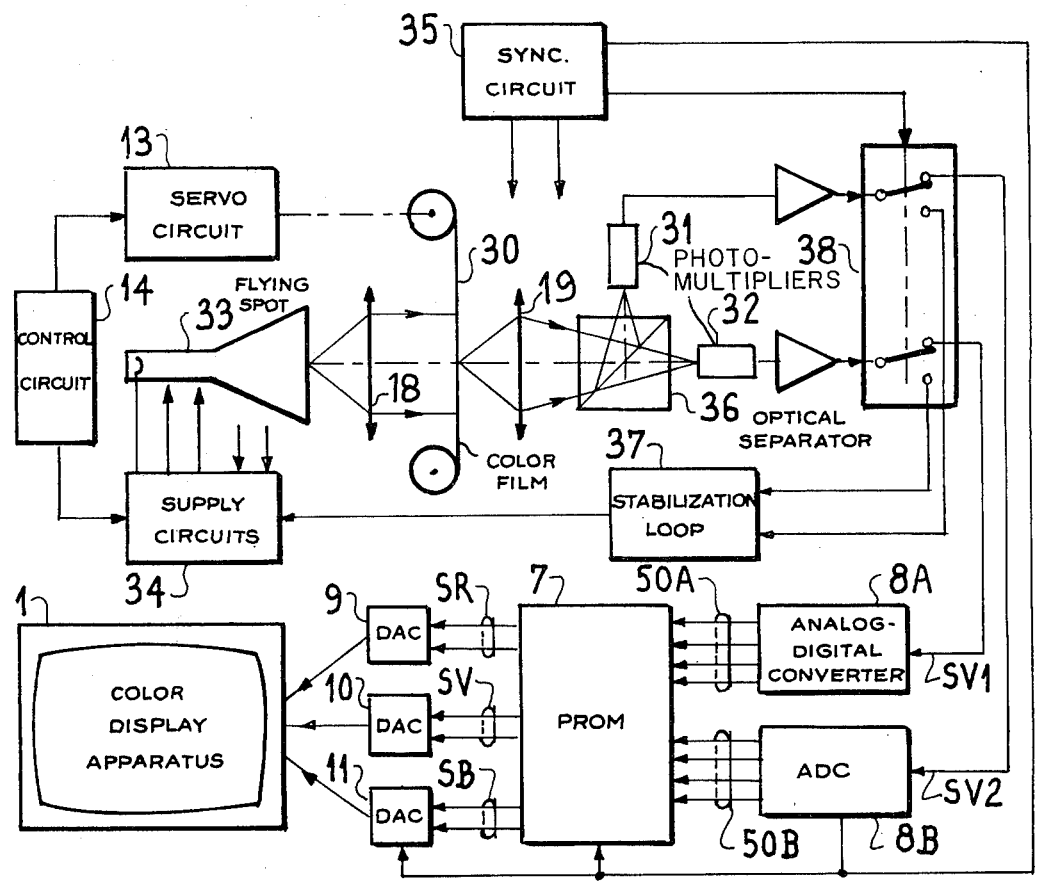
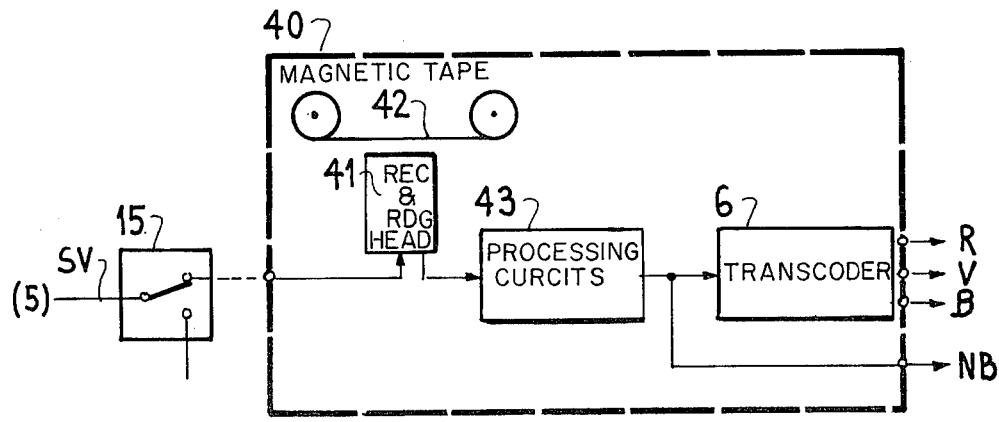

CARTOGRAPHIC INDICATING APPARATUS, PARTICULARLY FOR AERIAL NAVIGATION

FIELD OF THE INVENTION

Our present invention relates to cartographic indicating apparatus in which a geographical map, previously recorded on an optical, magnetic or other support, is analyzed by a reader for selecting the useful area of the map to be displayed and translating it into video signals suitable for color display on a cathode-ray-tube visualizer.

BACKGROUND OF THE INVENTION

Cartographic indicators showing the image of a geographical map to the pilots of certain craft are increasingly used, especially in the aeronautical field.

Thus, our invention more particularly relates to an aerial-navigation electronic indicator. A cartographic indicator is essentially used for providing the aircraft pilot with a geographical map of the overflown area. The traverse of the displayed area corresponds to the flight path and its positioning is dependent on the longitude and latitude of the aircraft and also, optionally, on its heading. In addition to the geographical map, the navigation device jointly displays markings and symbols for indicating the current position of the aircraft, as well as navigational data (speed, fuel consumption, route to be taken, etc.).

In the case of a map recorded on an optical support such as a photographic color film, a reader analyzing same comprises a spectral separator followed by photoelectric detectors or sensors, three of them being conventionally provided for producing the red (R), green (V) and blue (B) video signals necessary for the color presentation. Each of these detectors functions in a given spectral band and comprises either a television camera or a photomultiplier, depending on whether the reader uses a single light source or a flying-spot tube for transluminating the film. Apart from the detectors, the reader comprises circuits for controlling the cameras or the flying-spot tube, as well as video-amplification circuits.

In systems using a magnetic support (video disk or tape) as a recording medium, it is also necessary to preserve the distribution of the three basic colors on the support in order to enable the extraction of the corresponding video channels.

OBJECT OF THE INVENTION

The object of our invention is to provide improvements in a cartographic apparatus making it possible to reduce the overall dimensions and energy consumption of the equipment by decreasing the number of electronic components, which also increases its reliability. These factors are of vital importance in the case of equipment carried by aircraft.

SUMMARY OF THE INVENTION

The use of color for the geographical maps makes it possible to easily distinguish the various details to be represented and provides a convenient way in which these details can be coded, e.g. roads in red, forests in green, waterways in blue, etc. We have found that a suitable representation of a geographical map needs only a limited number n of plainly defined, distinct colors; that number n is generally close to 10. The term "distinct colors" is understood to mean clearly differentiated hues, such as yellow and red, as well as those which are derived from one and the same hue but differ from one another in shade or tint, e.g. a range of blues between light blue and dark blue. Thus, all the points of the same color or the same shade are identical as to chrominance and luminance; the video signals R, V and B leaving the analyzer scanning the map carrier will therefore encompass n distinct configurations, each configuration R, V and B corresponding to a predetermined color or tint. It follows that the colors of the documents being scanned are to be spectrally well defined and reproducible, the intensity of each color being known beforehand. Moreover, the reproduction of any such color involves but a predetermined combination of the contributions of the three basic chromatic components R, V and B.

In accordance with the present invention we provide a visualization system including a cartographic indicator wherein the document to be displayed, composed of a limited number of colors, is recorded on a storage medium such as a photographic film which is analyzed by a reader for producing three video-signal channels supplying a multicolor CRT display device. The original color data are transferred beforehand onto the film, either in two colors or in monochrome fashion, with compression of the light spectrum, the reader having only one or two sensors and a memory programmed for the point-by-point identification in real time of the color and for producing, on the basis of a predetermined correspondence table, a combination of the basic chromatic components R, V and B which it is desired to display as a replica of an original point of a multicolor image.

BRIEF DESCRIPTION OF THE DRAWING

The above and other features of our invention will now be described in greater detail with reference to the accompanying drawing wherein:

FIG. 1 is a block diagram of a first embodiment of a cartographic indicating apparatus forming part of a system according to our invention;

FIG. 2 is a block diagram of a second embodiment of an apparatus according to this invention;

FIG. 3 is a diagrammatic view of an optical film usable with the apparatus of FIGS. 1 and 2;

FIG. 4 is a diagram of a spectrum-compressing device for recording a map on a photographic film to be used by an associated cartographic indicator in a system according to our invention; and FIG. 5 is a diagram of a structural modification of our apparatus, designed for the use of cartographic information stored on a magnetic recording medium.

DETAILED DESCRIPTION

FIG. 1 shows a cartographic indicating apparatus according to our invention comprising analysis means, referred to as a reader, whose output signals representative of components R, V and B supply a CRT-type display 1, such as a color-television monitor.

A geographical map, or some other document exhibiting but a limited number of colors, is recorded on a support 2, specifically a photographic film. In order to be able to read same, the apparatus comprises a light source 3 with an associated power supply 4, optical components including a diaphragm 17 and lenses 18, 19 and photodetection and analysis means represented in FIG. 1 by a black-and-white TV camera 5. If a flying-spot tube is used as the light source (FIG. 2), the analysis of the useful area—generally performed line by line—is controlled at that source.

The system according to our invention requires only a small number of detectors or sensors such as camera 5. This results from the preliminary transcription of the original coloration data on support 2 by a spectrum compressor, as described hereinafter with reference to FIG. 4, using a reduced number of chromatic components, namely either two color components or the single luminance component. The latter (FIG. 1) is preferred because it enables the use of a single sensor, a video camera in the version of FIG. 1 or a photomultiplier if the source of translluminating light is a flying-spot tube.

When there are two chromatic components (FIG. 2) it is necessary to have two sensors, i.e. two video cameras for one fixed-source reader or two photomultipliers with one flying-spot tube.

Thus, the number of video channels issuing from the sensor is limited to not more than two whereby the components used for recording and reproduction are simplified. As it is necessary to identify and to visualize the desired color for each point of the image, the reader includes identification and reconstitution circuitry 6 which can be realized in a simple and compact manner.

In the version shown in FIG. 1, the film 2 is monochrome, i.e. black and white; the information regarding coloration of an image point is stored therein as different density levels represented by a variety of shades of gray. These levels are predetermined in relation to the different colors $C_1$ to $C_n$ to be transferred, n being the number of distinct colors of the document. Each color $C_j$ is allocated to a given density value $D_j$ of the film, i.e. a certain gray level in the range varying from black (value $D_1$) to white (value $D_n$). The range $D_1$ to $D_n$ extends, for example, between a density value close to zero and another value chosen to lie between 2 and 3 for a standard film.

Thus, the initial coloration $C_j$ constituted by X% red (R), Y% green (V) and Z% blue (B) is replaced by a new constituent $D_j$ having only a single parameter to be identified which consequently requires but a single detecting channel.

The monochromatic film 2 transluminated by source 3 is read by the single camera 5, which is only sensitive to the intensity of the light beam passing through the recorded image.

The video signal SV exiting from the camera is processed in identification and reconstitution circuits 6. The amplitude of this signal, assuming that the emission of source 3 is constant, is a known decreasing monotonic function of density $D_j$ and its value therefore makes it possible to identify the corresponding color $C_j$. It will become apparent hereinafter from FIG. 4 how the densities are formed for obtaining regularly spaced signal levels SV, thus permitting the immediate identification of the colors without intermediate coding. A table correlating level SV with color $C_j$ establishes the relationship between each identified color and a predetermined combination R,V,B for the CRT display. This is easily achieved with a programmed read-only memory (PROM) 7 by prior analog-digital conversion in a circuit 8 at the input of the memory and digital-analog reconversion in circuits 9, 10, 11 at the output thereof, inasmuch as the number n is small and generally below 16 so as to be represented by not more than four bits. Thus, converter 8 can quantize a detected signal level, pertaining to an original image point, as a four-bit word SD addressing the memory 7 which, according to the stored table, thereupon emits three binary words corresponding to parameters R, V and B. These words SR, SV and SB can have a very small number $m(2^m < n)$ of bits, e.g. m=2, for the selection of 16 out of 64 possible combinations. With three bits per converter 9, 10, 11 the choice is made from among 512 possible combinations and can therefore be considerably improved. The output converters 9, 10 and 11 thus reproduce the analog values R, V and B for use in display 1. It should be noted that the resulting combination is generally not identical with the proportions X, Y, Z of the original value $C_j$ of an image point of the document; it can closely approach it for a faithful reproduction but can also vary significantly therefrom if the user wishes to modify the original color or to replace it by another color. The color table is suitably coded in the desired sense.

The fidelity of reproduction or a high degree in the choice of reproducible shades is linked with the number of bits used for transcoding the input data in memory 7 into output data SR, SV and SB. The number of bits of input word SD is exclusively determined by the value n. In a simple example with n=7, word SD has three bits for coding seven different colors of the document: 000 black, 001 violet, 010 blue, 011 green, 100 yellow, 101 red and 111 white. This coding is obtained in circuit 8. Memory 7 has seven stored combinations of bit groups SR, SV and SB corresponding respectively to these values 000 to 111; with two bits per group, a violet point represented by code 001 can be reconstituted by SR=10, SV=00, SB=10, synthesizing a displayed replica constituted by 50% red and 50% blue.

The other elements shown in FIG. 1 include a circuit 12 for generating sync signals for the transcoder 6 and sweep or scan signals for camera 5, a film-advancing servo circuit 13 and a control circuit 14 for selecting the useful area to be scanned in two dimensions. In the case of an on-board cartographic indicator, circuit 14 is a computer which produces commands depending on the maneuvers performed by the aircraft. These circuits are not described in detail here and reference can be made e.g. to commonly owned U.S. Pat. No. 4,138,726.

Light-emission stability can be obtained by a test track PT, FIG. 3, which is carried by the film and whose density is known. This track is periodically read, e.g. on each vertical frame flyback or after a certain number of images. The corresponding video signal is derived from a branching circuit 15 which switches the video output of camera 5 to a control circuit 16 for regulating the intensity of source 3. Circuit 15 is switched with the desired timing by circuit 12. Circuit 16 may comprise a threshold comparator whose amplified output controls the power supply 4 feeding the light source 3; it is preset by suitably adjusting the threshold value of its comparator.

FIG. 3 shows a portion of film 2 with successive recorded sections $I_{j-1}$, $I_j$, $I_{j+1}$ of a map, a coded track PC for the identification of the channels and the aforementioned test track PT. Area $Z_j$ corresponds to that being analyzed as determined by a two-dimensional displacement of the film.

FIG. 4 illustrates a spectrum-compressing device for recording on the monochromatic film 2, with the aid of a filter $FL_j$, areas of selected coloration $C_j$ of a multicolor document DC. The document is illuminated by a source 20. An exposure meter 21, symbolized by a light-detecting diode, a capacitor and a threshold comparator 22, determines the exposure time. This time is regulated by calibrating the threshold value of comparator 22 for producing the corresponding desired density $D_j$ on film 2. The exposure meter controls the supply 23 of the source 20. This arrangement requires a change of filter FLj for each color, i.e. n filtering operations and as many exposures. We prefer, however, to replace these n filters by a single multilayer filter to illuminate the film 2 with a single exposure. In both instances, with $L_j$ denoting the luminance resulting from the color $C_j$ and $\tau_j$ denoting the transmissivity of the filter for that color, the filter or filters are so graded that the values $\tau_j$ and $L_j$ establish a linear luminance scale.

Therefore, on reading the film, regularly stepped detected signal values correspond to the different colors $C_1$ to $C_n$ with a constant amplitude increment. Thus, the simple analog-digital converter 8 present in the input of PROM 7 suffices and there is no need for a high-resolution coder.

FIG. 2 relates to a cartographic indicating apparatus according to our invention where the storage medium is constituted by a polychromatic film 30 on which the colors $C_j$ are represented by two chromatic components, preferably lying within the spectra of colors V and B. Film 30 is exposed in accordance with the method described hereinbefore, using a multilayer filter adapted to totally eliminate the component which is not retained, namely in the present case a spectral band in the red range. Each point is consequently defined by two parameters, Y% of V and Z% of B, the density $D_j$ resulting from the sum Z+Y being thus prerecorded as described with reference to FIG. 4. The source of the film-transluminating light beam is a flying-spot tube 33 working into two photomultipliers 31 and 32; this takes the place of two video cameras. The sweep circuits 34 of the tube 33 are controlled by a synchronization circuit 35. A partly reflecting prism 36 separates beams "V" and "B" of different spectral bands and respectively directs them toward the two sensors represented by photomultipliers 31 and 32. Two analog-digital converters 8A, 8B in the address input of PROM 7 respectively receive the two video channels. A stabilization loop for the source 33 comprises a double switch 38, operated by circuit 35, and a command circuit 37 which controls the supply circuit 34 for influencing the spot intensity. Circuit 37 can be identical with circuit 16 of FIG. 1 and have only a single input if the test track of the film contains only one of the selected components V, B.

The modification of FIG. 2, while still being more compact than the conventional system with three sensors, has the advantage over the embodiment of FIG. 1 that the amount of information received by the transcoder including PROM 7 is twice as high, leading to a greater operating and coding reliability which better protects the system against possible variations in the film density due e.g. to aging. However, compared with the preceding embodiment, it has the disadvantages of requiring the use of a color film in place of a black-and-white film and two sensors instead of one.

Our present invention is not limited to cartographic indicating apparatus in which the mass storage medium is an optical support but encompasses other systems with magnetic tape, video disk or the like.

FIG. 5 illustrates a magnetic-tape apparatus comprising a simple black-and-white magnetoscope 40 additionally equipped with identification and reconstitution circuitry in the form of a transcoder 6 according to FIG. 1. The compressed-spectrum information is easily recorded on a tape 42 with the aid of the monochromatic film 2 and the reader of FIG. 1 by applying the detected signal SV from camera 5 and switchover circuit 15 to the corresponding input of the magnetoscope 40 feeding a recording and reading head 41. Thus, the initial color image is stored on a single track of magnetic tape 42. During reading, head 41 supplies the stored information to processing circuits 43 and the resulting signals are transcoded in circuitry 6 as described hereinbefore for obtaining signals R, V and B.

The advantages resulting from an apparatus according to our invention can be summarized as follows: not more than two sensors and video amplifiers; reduction of the number of components; simplification of circuits; increased reliability; immediate possibility of modifying the colors of the map; replacement of a memory designed for a color recorder by a data store able to record only a monochromatic signal (e.g. a black-and-white film); possibility of better adaptation of the analyzer to the sensitivity range of the associated signal receiver in the case of optical reading.

What is claimed is:

1. A system for visually reproducing in a predetermined number n of distinctive colors a multicolor document with image points whose coloration includes the three basic chromatic components red, green and blue, comprising:

a spectrum-compressing device including optical filter means for converting each image point of said document into data transferred to a recording medium for storage thereon, said data consisting for each image point of at most two signal levels separately identifiable on said recording medium;

analyzing means for scanning said recording medium to recover therefrom the stored signal levels pertaining to respective image points;

analog-digital conversion means connected to said analyzing means for quantizing each signal level as one of n binary values corresponding to said number of distinctive colors;

transcoding means connected to said analog-digital conversion means for replacing the binary values pertaining to said image points by respective sets of three m-bit words each, with $2^m < n$, said transcoding means including a read-only memory addressable by said binary values for delivering said three m-bit words of each set to respective digital-analog converters, said digital-analog converters being coupled to said transcoding means for respectively translating the m-bit words of each set into amplitudes of said three basic chromatic components; and display means coupled to said digital-analog converters for contributing to a colored visualization of a replica of the corresponding image point.

2. A system as defined in claim 1 wherein said filter means is graded to transmit said basic chromatic components with different degrees of luminance onto a photographic film.

3. A system as defined in claim 2 wherein said film is monochromatic, said filter means being graded to translate the coloration of each image point into a distinctive shade of gray.

4. A system as defined in claim 3 wherein said film constitutes said recording medium, said analyzing means including a light source transluminating said film and a single sensor detecting the intensity of the light traversing said film, said analog-digital conversion means comprising a single converter connected to said sensor for quantizing an output signal thereof.

5. A system as defined in claim 4 wherein said sensor comprises a video camera.

6. A system as defined in claim 3, further comprising magnetoscopic means for transferring the data recorded on said film onto a magnetic tape, said analyzing means including reading means for picking up the information stored on said tape.

7. A system as defined in claim 2 or 3 wherein said film is polychromatic, said filter means being graded to suppress one of said basic chromatic components whereby the data transferred to the film consist of different combinations of the remaining two basic chromatic components, said analyzing means including a light source transluminating said film and an optical separator in a path of a light beam passed by said film for feeding the remaining chromatic components of said light beam to a pair of sensors generating respective output signals depending upon the intensities of said remaining components, said analog-digital conversion means comprising two converters respectively connected to said sensors for quantizing said output signals.

8. A system as defined in claim 7 wherein said source comprises a flying-spot tube, said sensors being photomultipliers.

9. A system as defined in claim 1 wherein said display means comprises a cathode-ray-tube monitor.

10. A system as defined in claim 1 wherein said recording medium is a photographic film, said analyzing means comprising a source of light transluminating said film and a video camera receiving the light passed by said film.

11. A system as defined in claim 1 wherein said recording medium is a photographic film, said analyzing means comprising a flying-spot tube generating a beam of light transluminating said film and photomultiplier means intercepting said beam of light downstream of said film.

12. A system as defined in claim 1 wherein said recording medium is a magnetic tape, said analyzing means comprising a reading head juxtaposed with said tape.

* * * * *